Oct. 26, 1965   R. MICKLER   3,213,566
APPARATUS FOR MOVING DISPLAY OBJECTS
Filed July 26, 1963
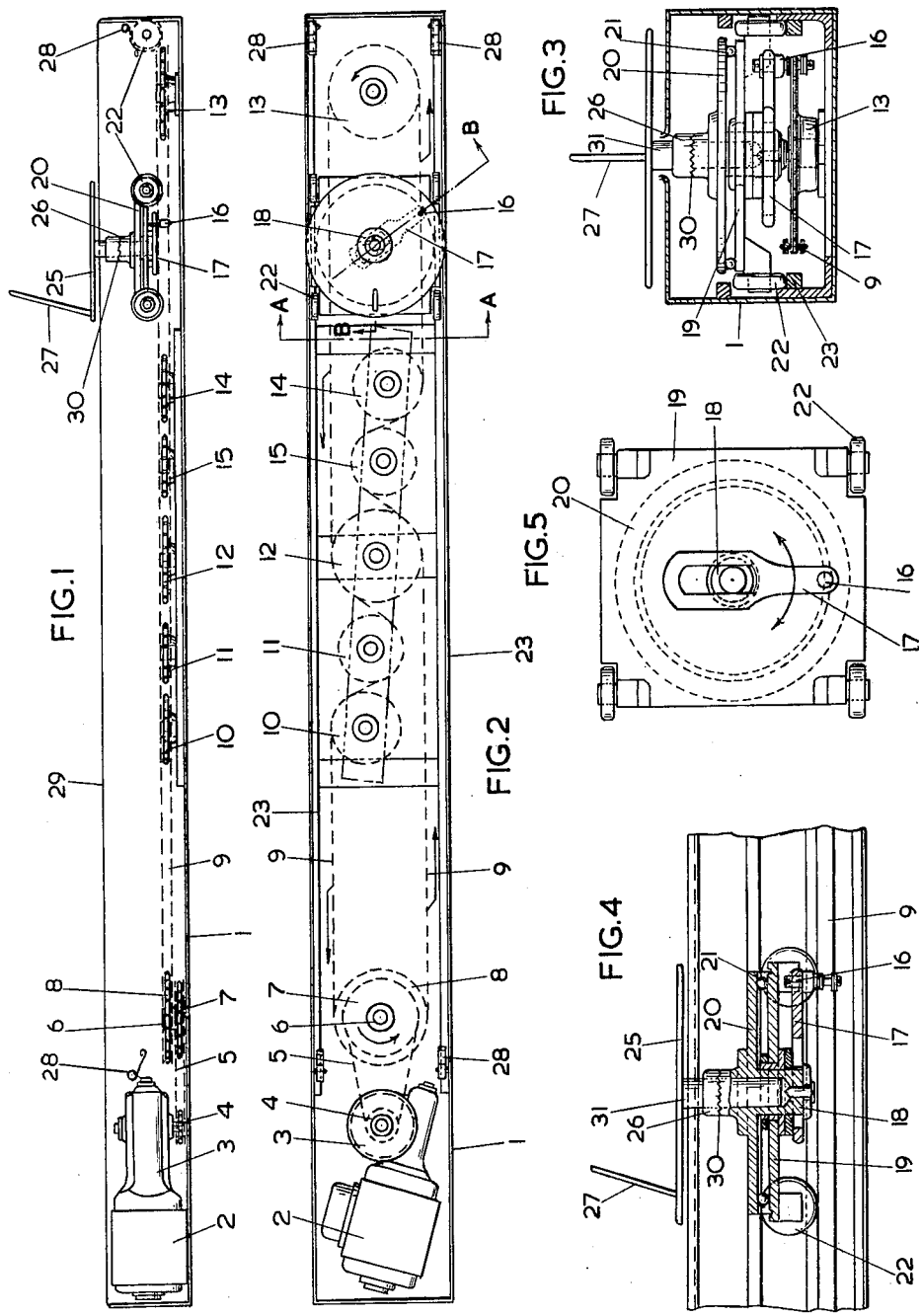

United States Patent Office 3,213,566
Patented Oct. 26, 1965

3,213,566
APPARATUS FOR MOVING DISPLAY OBJECTS
Rudolf Mickler, Altdorf, Allgau, Germany, assignor to Rudolf Jan Mickler, London, England
Filed July 26, 1963, Ser. No. 297,817
10 Claims. (Cl. 40—106.31)

This invention relates to an apparatus for moving display objects, more particularly show window dummies, of the type having a trolley moved by motor through an endless chain or the like traction means and carrying the base of the dummy, the said trolley having a rotatable disc for receiving the said base.

A known apparatus of this type has a trolley which serves to receive the display object and which by means of an electric motor, carried by the trolley, is automatically moved along guide rails. In this arrangement the motor drives both the running wheels of the trolley and, intermittently, a turntable on which the object to be displayed is situated. The turntable is driven through selectively engageable toothed gearing and the engagement is effected by means of stationary cam members which are arranged in the path of the trolley movement. This arrangement is very complicated and has a considerable structural height, which is generally undesirable. Moreover, it has the disadvantage that the rotary movement of the turntable starts with a jerk when the respective gearwheels are brought into engagement with one another. The movements of the display object which, for example, can be a clothes dummy, are therefore jerky and unnatural. Furthermore, the object effects, during its rotation, a continuous linear movement with the trolley, which is frequently not preferable.

Devices for displaying objects are also known in which the trolley is driven through an endless chain by a stationary motor. The chain is connected at one point directly to the axle of a turntable mounted on the trolley, and thus pulls the trolley along. During this movement the turntable engages, by means of its appropriately shaped periphery, a counter-guide, for example, a toothed rack, and thus effects an additional, rotary movement. If only intermittent rotation of the turntable is required, the counter-guide must be provided with gaps. Since between the line of action of the chain on the axle of the turntable and the point of action of the counter-guide on the periphery of the turntable a certain distance exists, there is in these arrangements an undesirable tipping moment, which must be taken up by additional guides and which causes unsteady running through increased friction. It has therefore been proposed to improve this arrangement by causing the trolley driving chain to act on the periphery of the trolley which for this purpose is constructed as a sprocket wheel and the opposite peripheral side of which engages in a stationary chain acting as counter-guide. This, however, gives rise to the disadvantage that the trolley tends to participate in the rotary movement and a smooth rolling of the running wheels of the trolley is no longer possible. Moreover, here again a tipping moment occurs, because the point of action of the tractive force on the trolley is comparatively high in relation to the running plane of the wheels. Furthermore, these arrangements also suffer from the disadvantage that in the case of an intermittent rotary movement of the turntable, this movement starts and stops with a jerk. These disadvantages lead to unsteady movements of the display object with a great deal of vibration.

The present invention aims at obviating the fore-going disadvantages of the known apparatus and at providing a simple, easily transportable apparatus of comparatively low height.

To this end the present invention consists in an apparatus for moving display objects, more particularly show window dummies, along a predetermined path and for imparting to said objects a rotational movement at least over a portion of said path, comprising a trolley movable along said path, a member rotatably mounted on said trolley and adapted to carry said object, an endless chain or the like traction means driven by a motor, coupling means connecting said chain to said rotatable member at a point radially displaced from the axis of rotation thereof, and at least two guide wheels for the chain or the like traction means, the arrangement being such that when said point passes over a guide wheel said coupling means is moved angularly about said axis whereby to cause rotation of said member. In this way only a single traction means, for example, a chain, without counter-guides or additional toothed racks, is required in order to obtain the two movements. By virtue of the arrangement of the said guide wheels for the traction means in order to achieve the rotation of the turntable, a gradual acceleration of the dummy from a relative condition of rest to a rotary movement and vice versa is obtained. Furthermore, on the commencement of rotation, the advancing movement of the trolley gradually becomes slower, then stops altogether, and on termination of the rotary movement starts gradually again. The apparatus according to the invention therefore permits steady and flowing movements of the display object.

In order that the invention may be more readily understood, reference is made to the accompanying drawings which illustrate diagrammatically and by way of example one embodiment thereof, and in which:

FIGURE 1 shows a side elevation of an apparatus for moving show window dummies, one longitudinal side wall of the apparatus housing being removed for the sake of clarity, FIGURE 2 is a plan view corresponding to FIGURE 1 with the housing cover removed, FIGURE 3 is a section on the line A—A of FIGURE 2, to a larger scale, FIGURE 4 is a section on the line B—B of FIGURE 2, to a larger scale, and FIGURE 5 is a view from below of the trolley, also to a larger scale.

Referring now more particularly to the drawings, the housing 1 contains a stationary electric motor 2 which through a worm drive 3 drives a sprocket wheel 4. The latter is connected through a chain 5 to a sprocket wheel 7 which is joined fast to a further sprocket wheel 8, and mounted together with the wheel 8 on an axle 6. The actual endless driving chain 9 for a trolley 19 is driven by the sprocket wheel 8.

The chain 9 is guided over further sprocket wheels 10, 11, 12, 13, 14 and 15, the position of which is fixed relative to one another. The chain 9 carries a bolt 16 which engages in a slotted link 17. The latter is mounted to be non-rotatable and radially slidable on a hollow axle 18 which is rotatably mounted in the trolley 19 and projects beyond a turntable 20 situated above the trolley, the turntable 20 being joined fast to the axle 18. The turntable 20 is supported by means of balls 21 on the trolley 19 which is provided with wheels 22 adapted to run on rails 23 secured to the housing 1. The connections between the bolt 16 and the slotted link 17 lies approximately in the plane of the running path of the wheels 22. The axle 18 at its upper end is formed or provided with a crown toothing 30 which meshes with a corresponding toothing formed or provided on a sleeve 26 of a base member 25, when the latter is inserted by means of a bolt 31 into the axle 18. A pin 27, which in a known manner engages in one of the feet of the dummy (not shown) to be moved, is secured in the base 25 and supports the dummy. The latter can be thus conveniently mounted on the turntable 20 so as to face in any desired direction.

The mode of operation of the apparatus is as follows:

After the dummy has been placed in the manner described by means of its base 25 on the turntable 20, the motor 2 is switched on. Through the worm drive 3, wheel 4, chain 5, and wheel 7, the sprocket wheel 8 is rotated and in turn drives the chain 9, so that the trolley 19 is moved, pulled by the chain 9, through the bolt 16, the slotted link 17, and the axle 18. There is no relative movement between the turntable 20 and the trolley 19 as long as the bolt 16 is outside the range of the guide wheels 10, 11, 12, 13, 14 and 15, for example, moves along the straight stretch on the right of FIGURE 2 so that the direction in which the dummy faces is unchanged. When, however, the bolt 16 of the chain 9 reaches the guide wheel 13 and runs around its periphery, the turntable 20 is rotated while the trolley is at rest. In the present case the turntable 20 effects a rotation through 180°, in which the dummy also participates. In order to prevent movement of the trolley in the opposite rectilinear direction until the half-revolution of the turntable 20 has been completed, springs 28, provided on the housing 1, engage two of the wheels 22 of the trolley when the latter stops in the respective end position.

During the return run of the trolley, that is during travel thereof in the said opposite rectilinear direction, the dummy is again at rest in relation to the trolley until the bolt 16 reaches the guide wheel 12. When the bolt 16 runs along a part of the periphery of this guide wheel, the turntable 20 with the dummy rotates in relation to the trolley 19 through approximately 90°. During the rotation the trolley is at rest. This rotation enables the onlooker in front of the show window to view the decoration carried by the dummy from a different angle. Following the last mentioned rotation, the dummy rotates approximately through 90° in the opposite direction when the bolt 16 runs along part of the periphery of the guide wheels 11 and 12, so that the dummy is brought into the position originally assumed at the beginning of the return run. In this way the dummy is presented to the viewer from different angles, while the different movement phases merge flowingly into one another. The course of the movements corresponds to a great extent to natural movements of a human model, since on each rotation of the dummy its movement of advance is slowed down or entirely stopped and gradually resumed again only when the rotation is completed. When the driving wheel 8 is reached, the dummy is again rotated through 180° and the movement of the trolley is reversed into another rectilinear movement so that, for example, the dummy always faces in the direction of movement of the trolley.

The simple construction of the apparatus, its low structure and the fact that it is easily transportable are considerable advantages. The housing 1, which is protected against the entry of dust by the cover 29, can easily be erected in any position in any show window. The apparatus can alternatively be so constructed that the trolley not only effects a rectilinear advance movement, but can also move in curves or on a circular or elliptical path. For this purpose it is merely necessary to dispose the guide wheels in a suitable manner. In this way it is possible to perform movements of any kind adapted to the shape of the show window, and these can be interrupted by additional rotations of the dummy at predetermined intervals. The paths to be travelled can be extended as desired. All these movements can be effected by means of the driving chain 9 which, for example, can be replaced by a rope or belt, while the remainder of the arrangement can be modified structurally in many ways, without departing from the scope of the invention. Thus, instead of the slotted link 17, there may be provided a direct engagement of the bolt 16 with a turntable mounted on the trolley, possibly through a radial guide. The apparatus is moreover not restricted to dummies as display objects. Any other objects can be carried by the trolley in the manner described. Instead of the base 25, a rotatable cross or cross-beam may be provided to carry two or more dummies or other display objects.

I claim:

1. An apparatus for moving display objects to and fro along a predetermined path and for imparting to said objects a rotational movement at least over a portion of said path, comprising a trolley movable to and fro along said path, a member rotatably mounted on said trolley and adapted to carry said object, endless traction means operatively connected to said trolley, a motor for driving said endless traction means, coupling means connecting said traction means to said rotatable member at a point radially displaced from the axis of rotation thereof, and at least two guide wheels for the endless traction means, the arrangement being such that when said point passes over a guide wheel said coupling means is moved angularly about said axis whereby to cause rotation of said member.

2. An apparatus as claimed in claim 1, wherein the coupling means includes a bolt secured to the chain or the like traction means and a slotted link radially slidably mounted about the axle of the rotatable member and connected pivotally to said bolt.

3. An apparatus as claimed in claim 2, wherein the bolt is arranged to engage the chain approximately in the horizontal plane of the running path of the trolley wheels.

4. An apparatus as claimed in claim 1, wherein a plurality of additional guide wheels is disposed intermediate said two guide wheels.

5. An apparatus as claimed in claim 1, wherein all the guide wheels effect a temporary stoppage of the trolley and a partial rotation of the rotatable member.

6. An apparatus as claimed in claim 1, wherein one of said guide wheels serves as a driving wheel for the chain or the like traction means.

7. An apparatus as claimed in claim 1, wherein a platform is provided for supporting the object to be displayed, said platform being mounted on the rotatable member for rotation therewith.

8. An apparatus as claimed in claim 7, wherein means are provided for varying the angular position of the platform with respect to the rotatable member, said means including a spigot on the underside of the platform engaging a socket in the rotatable member and a collar provided with crown toothing engaging complementarily shaped toothing provided on said socket.

9. An apparatus for moving display objects to and fro along a predetermined path and for imparting to said objects a rotational movement at least over a portion of said path, comprising a trolley movable to and fro along said path, an axle on said trolley, a member rotatably mounted on said axle and adapted to carry said object, an endless chain operatively connected to said trolley, a motor for driving said endless chain, a bolt secured to the chain, a slotted link connected at one end to said bolt and mounted at the other end about said axle for connecting said endless chain to said rotatable member at a point radially displaced from the axis of rotation thereof, and at least two guide wheels for the endless chain, the arrangement being such that when said point passes over a guide wheel said bolt and slotted link are moved angularly about said axis whereby to cause rotation of said member.

10. An apparatus for moving a display object along a predetermined path and for imparting to said object a rotational movement at least over a portion of said path comprising, in combination, guide means extending along said predetermined path and having opposite ends; a trolley mounted on said guide means for movement back and forth between said opposite ends of said path; a pair of guide wheels respectively turnably mounted at said opposite ends of said path; endless traction means extending about said guide wheels; drive means operatively connected to one of said guide wheels for driving thereby said endless traction means; an axle turnably mounted on said trolley; a member fixed to said axle for turning therewith about the axis of the latter relative to said trolley and adapted to carry said object; and coupling means including a link connected in the region of one end thereof to said axle for turning movement therewith and slidably in radial direction thereof and pivotally connected at a point spaced from said axle to said traction means so that when said point passes over one of said guide wheels, said coupling means is moved angularly about said axis to cause rotation of said member and so that said trolley is pulled by said traction means back and forth between said opposite ends of said path.

References Cited by the Examiner
UNITED STATES PATENTS

| | | | |
|---|---|---|---|
| 2,228,610 | 1/41 | Reid | 40—106.31 |
| 2,784,525 | 3/57 | Grierson | 40—106.31 |
| 2,810,975 | 10/57 | Goehring | 40—106.31 |

EUGENE R. CAPOZIO, *Primary Examiner.*

JEROME SCHNALL, *Examiner.*